(12) United States Patent
Marshall (10) Patent No.: US 8,481,904 B2
(45) Date of Patent: Jul. 9, 2013

(54) AUTOFOCUS SYSTEM WITH STRAY LIGHT COMPENSATION

(76) Inventor: Daniel R. Marshall, Boise, ID (US)

( * ) Notice: Subject to any disclaimer, the term of this patent is extended or adjusted under 35 U.S.C. 154(b) by 373 days.

(21) Appl. No.: 12/987,027

(22) Filed: Jan. 7, 2011

(65) Prior Publication Data

US 2012/0175495 A1 Jul. 12, 2012

(51) Int. Cl.
*G02B 7/04* (2006.01)
(52) U.S. Cl.
USPC .................................................... 250/201.4
(58) Field of Classification Search
USPC .................................. 250/201.2–201.8
See application file for complete search history.

(56) References Cited

U.S. PATENT DOCUMENTS

| 5,142,517 A * | 8/1992 | Takahashi | 369/44.34 |
| 5,814,807 A * | 9/1998 | Musha et al. | 250/201.5 |
| 7,348,528 B2 | 3/2008 | Marshall | |
| 7,550,699 B1 | 6/2009 | Marshall | |
| 2007/0177470 A1 | 8/2007 | Marshall | |

* cited by examiner

*Primary Examiner* — Thanh Luu
(74) *Attorney, Agent, or Firm* — Parsons Behle & Latimer (57) ABSTRACT

An autofocus system adaptable for use in microscopes or other optical systems incorporates an auxiliary photodetector that measures light only from a reference light source. An outgoing reference beam, incident upon a target to be inspected, is reflected to become an incoming reference beam incident on a photodetector. The photodetector generates a focus error signal proportional to the displacement of the target from the ideal focal point. The auxiliary photodetector generates a correction signal proportional to the output of the reference light source. The correction signal is used to compensate the focus error signal for stray light generated by the reference light source. The compensated focus error signal may be used to drive a servomechanism to displace either the target or the microscope objective lens to bring the target into focus. The correction signal may also be used to compensate the reference light source gain to control the reference light source output.

25 Claims, 8 Drawing Sheets

AUTOFOCUS SYSTEM WITH STRAY LIGHT COMPENSATION

BACKGROUND

1. Field of the Disclosure

The present application relates generally to optical systems for sensing state of focus of an image or a focused beam and, more specifically, to an optical apparatus and autofocus system which compensates for stray or reflected light from its own light source.

2. Description of the Related Art

A microscope is an optical instrument that has historically employed two or more lenses to make enlarged images of minute objects. In a so-called compound microscope, an objective lens is placed near a target to be viewed and the user views an image of the target through an eyepiece lens. In order to provide a clear and accurate image of the target, the microscope must be properly focused. Typically, microscopes can be focused either manually by the user or by built-in focusing system.

Focusing systems can be either passive, that is acting upon the quality of the collected image to find the best focus; or they can be active, that is, probing the target to find the correct distance for best focus. Occasionally sound or even jets of air have been used to probe for best focus, but modern actives systems typically use optical means.

An active optical focusing sensing system is an optical device that senses the state of focus of, for example, an image-forming device or a light-focusing device such as a microscope, by emitting one or more beams of light that are made to reflect from the surface under examination. The reflected light is then collected and processed so that the state of focus of the optical system may be controlled. In the case where the focus of the optical system is controlled dynamically it may be used as a component of a focus controlling system, that is, an autofocus system.

Prior art devices include optical systems, in which assemblies of light emitters, lenses, mirrors, filter, windows, detectors and similar optical components are combined so that light may be used as a measurement tool. Some of these devices measure qualities of light that have been reflected from a surface under investigation to determine properties of the surface, an optical system, or both. Many prior art devices project a spot of light through an axially symmetrical objective lens onto a target surface. Other focus sensing devices have used one or more toric lenses to form a line focus which is projected onto a target surface.

In general, a toric lens is one which has different curvatures in two principle sections. A cylinder lens is a limiting case of a toric lens where the radius of curvature in one section is infinite, that is, the section is flat, while the radius of curvature in the other section is finite, but non-zero. Toric lenses introduce astigmatism into the outgoing beam of light. Instead of having a single point focus, an astigmatic system has two line foci. Where astigmatic lenses have been used previously by others, only one of the two astigmatic line foci has been used. In those applications the line focus has been used to perform an averaging function to reduce the effect of local asperities in the surface under observation.

In another example, a light beam is projected onto a microscope sample in order to determine whether the sample is correctly focused. An error signal derived in this way can be used to maintain correct focus of the microscope in order to stabilize the image or to remain focused upon moving surfaces. Such an auxiliary optical system—an autofocus system—may be used to automate an inspection system that includes a microscope. The general result is improved image quality or improved irradiance control at the target because of better response to changing focus and stability of focus over time than could be provided by a human observer. Focusing times of a few milliseconds and axial position sensitivity of a fraction of the wavelength of light can be achieved by these autofocus systems. Typically active focus sensing systems are used in applications where greater speed is required, or where the surface under study is extremely uniform and there is essentially no detail for a passive focus sensing technique to use for measuring the state of focus. Many other types of optical systems have been used in prior art to make measurements or to study small objects and will not be mentioned here because they are similar to those of autofocus systems.

Idealized optical systems focus light, produce images or make measurements, subject to theoretical limits that apply to optical and measuring devices. These limiting factors include diffraction, optical aberrations, electronic noise, pixel dimensions in the case of pixelated cameras, dynamic range and sensitivity, sampling rates, etc. Among other things, theoretical limits describe the smallest resolvable features, the least amount of light detectable and the largest axial or radial region in which the image is sensibly well focused and sharply defined, assuming a system that is free of manufacturing errors and aberrations. An autofocus system has the task of maintaining correct focus to help deliver the best possible optical system performance.

For example, lenses are refractive devices. That is, they depend on discontinuities (or sometimes continuous internal variations) in the refractive index of light through a transparent medium in order to bend light as it transits the optical component. In this way they can form images or selectively sample a beam of light. However, even idealized lenses reflect light from their surfaces, where there is a discontinuity in refractive index. The resulting reflected light usually decreases the performance of an optical instrument, because the resulting so-called stray light decreases image contrast or introduces errors into optical measurements. Single or multilayer thin coatings of dielectric materials can be used to reduce, but not completely eliminate these reflections, especially when light of varying wavelength (color) transits the system. Other idealized limitations on optical performance can substantially affect achievable optical performance, but an optimally focused optical system will always produce better results than a poorly focused one.

In the case of an active focus measurement or controlling device, stray light can cause problems, especially when the target is poorly illuminated or reflects little light. An ideal focus measurement/control device must correct for variation in the reflection at a target surface either by changing the output power of the source, by changing the gain of the receiving circuit or by accepting a loss of gain in the focus signal generating part of the device. When the device is initially constructed a correction for stray light is often included by using a target surface whose reflectance is fixed, so that the optical system is clearly focused. However, in practice the optical system must respond to targets of varied reflectance, and the original stray light correction may no longer be appropriate. In this case the result of stray light is an error in measured focus that varies with the amount of reflected light. At one output level there is zero error, but at other output levels there is a measurable error. What is needed then is an autofocus system that compensates for the effects of stray light.

SUMMARY OF THE DISCLOSURE

The present disclosure provides an autofocus system which corrects a focus error signal to maintain correct focus in an optical system such as a microscope, for example. In one embodiment, an autofocus system is provided for use in an optical system that is capable of examining a target surface and that includes an objective lens defining a system in-focus region. The autofocus system includes a light source emitting an outgoing reference beam of light, wherein a portion of the outgoing reference beam is reflected from the target surface as an incoming (returning) reference beam. A photodetector is positioned in the path of the incoming reference beam and generates an electrical focus error signal according to the position of the incoming reference beam incident on a sensing surface of the photodetector. An auxiliary photodetector is positioned to receive a portion of the outgoing light emitted by the light source to generate an electrical correction signal proportional to the light incident on a sensing surface of the auxiliary photodetector. A reflecting knife-edge element is disposed in the outgoing reference defining a plane and obstructing a portion of the outgoing reference beam on a first side of the plane while passing the remainder of the outgoing reference beam on a second side of the plane. The knife-edge element is adapted to reflect the incoming reference beam on the first side of the plane. The knife-edge element is further adapted to reflect the obstructed portion of the outgoing reference beam onto the sensing surface of the auxiliary photodetector as a reference that follows the amount of light in the outgoing beam.

In another embodiment, a method of compensating for stray light emitted by a light source is provided for use in an optical system that is capable of examining a target surface and that has an objective lens defining a system in-focus region. The method includes the steps of (1) providing an outgoing reference beam of light, wherein a portion of the outgoing reference beam is reflected from the target surface as an incoming beam; (2) generating an electrical focus error signal proportional to the position of the incoming reference beam on a sensing surface of a photodetector; and (3) generating an electrical signal proportional to light emitted by the light source incident on a sensing surface of an auxiliary photodetector. The method also includes the step of reflecting a portion of the outgoing reference beam onto the sensing surface of the auxiliary photodetector.

BRIEF DESCRIPTION OF THE DRAWINGS

The following figures, in which like numerals indicate like elements, form part of the present specification and are included to further demonstrate certain aspects of the present disclosure. These embodiments depict the novel and non-obvious aspects of the disclosure shown in the accompanying drawings, which are for illustrative purpose only. The disclosure may be better understood by reference to one or more of these figures in combination with the detailed written description of specific embodiments presented herein.

These and other embodiments of the present application will be discussed more fully in the description. The features, functions, and advantages can be achieved independently in various embodiments of the present disclosure, or may be combined in yet other embodiments.

DETAILED DESCRIPTION

The present disclosure relates to system performance reduction caused by non-ideal behavior of the system as a result of stray light in an optical system such as a microscope, for example. Stray light is any light in an optical system that does not contribute to the desired image or signal. Stray light can result from surface reflections from transparent optical components, internal inclusions of foreign material or bubbles, or simply from excess light produced by a light source that does not follow the intended light path, for example, because of surface reflections, a mismatch in beam divergence/convergence angles or through misalignment. If stray light falls on a detector it may create an error in the measurement of light position, angle, power or energy. Embodiments of the present disclosure apply a correction to a focus error signal that is proportional to the output of a light source, such as a laser, for example, as measured by an auxiliary photodetector that detects the light output from the light source.

It is assumed in this method that the stray light pattern that falls on the focus sensing detector has irradiance proportional to the output of the light source which is used to probe focus, so that a detector whose output is proportional to the light output of the light source will generate an offset term that accurately corrects for stray light. In other words, the assumed behavior of the optical system is invariance of the stray light as a fraction of the total output of the light source. Therefore, as long as the paths for the creation of stray light remain the same, an electrical offset proportional to the output of the light source will correctly compensate for stray light. It is therefore essential in designing an optical system using the disclosed technique to minimize any changes in the sources of stray light over time, temperature or light source power levels through optical non-linearity. Those skilled in the art will realize that optical non-linearities will be extremely unlikely, given the power levels, materials and geometries used in optical focus sensing systems.

Figure 1:
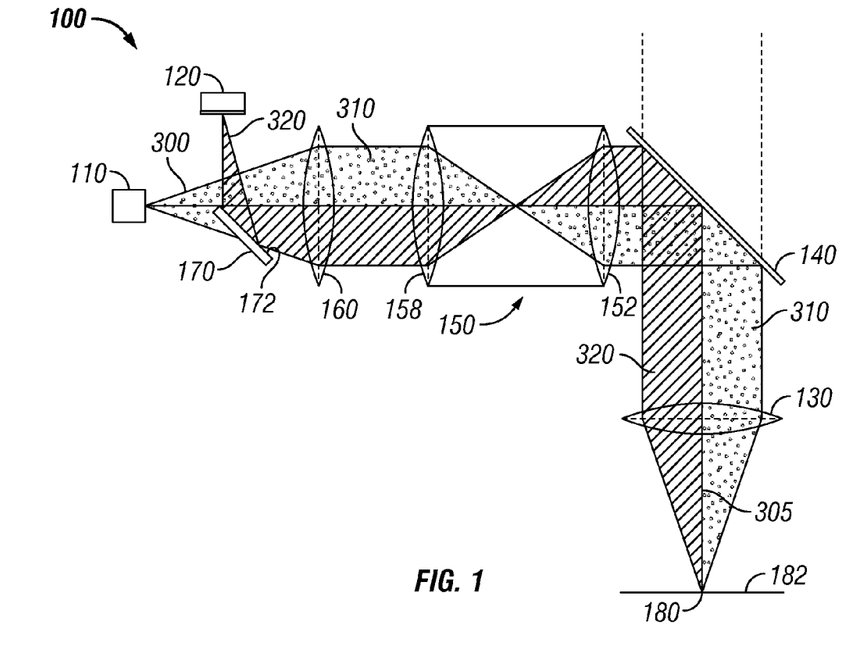
FIG. 1 is a block diagram illustrating a prior art autofocus system.

Referring now to FIG. 1, a basic focus sensing system 100 is shown. Light source 110 emits an outgoing beam 300 of light, a portion of which is blocked by a knife-edge element 170. Light source 110 may be a laser diode, but any suitable light source may be used for light source 110. U.S. patent application Ser. No. 11/614,234 filed Dec. 21, 2006, published as U.S. Pre-Grant Publication No. 2007/0177470, entitled "Distance Measuring System," which is incorporated by reference in its entirety herein, describes inclusion of a knife-edge element to create an outgoing reference beam which allows the outgoing reference beam and incoming reference beam to follow the same path so that the apparent motion of the spot on the target surface is not detected by the photodetector. The outgoing reference light beam 310 (the unblocked portion of outgoing light beam 300) passes through a collimating lens 160 and then enters an optical relay 150. One advantage of inserting a relay into any optical system is to provide spatial separation between optical elements without creating optical separation.

The unblocked portion of outgoing beam 300 becomes an outgoing reference light beam 310 which is reflected from the beam-splitter 140 to then pass through objective lens 130 before impinging upon target surface 182. Reflection from the target 180 causes the outgoing reference beam 310 to cross the optical axis 305 to become incoming reference light beam 320.

The inclusion of the beam-splitter 140 is optional, its purpose being to provide visual access through an alternate viewport as a portion of the light reflected from the target 180 passes straight through to a human user, for example, either directly by means of viewing eyepieces, or indirectly through a camera system. Where alternate access to the optical path is not required, the beam splitter 140 may be eliminated, resulting in an unfolded straight optical path. When included, beam splitter 140 reflects the incoming reference beam 320 back through the optical relay 150 and collimating lens 160. The backside of knife-edge element 170 includes a mirror 172 that reflects the incoming reference beam 320 to photodetector 120 which produces a focus error signal. By precisely subtending the incoming reference beam 320 over the portion of the optical path not taken by outgoing reference beam 310, knife-edge element 170 performs multiple functions, acting as a knife-edge in the outgoing path, as a knife-edge in the incoming path, as a lossless beam splitter for the half of the beam used for focus sensing, and as a fold mirror. Although a single lens 160 is shown in FIG. 1 being used in both the outgoing path and the incoming path, it is also possible to use two separate lenses; one for collimating the outgoing light and one for focusing the return light. In this alternate configuration, the lenses would be placed on the other side of mirror 172, that is, the collimating lens would be placed between the light source 110 and the knife-edge element 170 while the focusing lens would be placed between the mirror 172 and the photodetector 120.

The paths traced by the outgoing and incoming reference beams 310, 320, respectively, are parallel and complementary and provide rejection of tilt at the target surface 182 and simplicity of alignment of the optical system. U.S. Pat. No. 7,348,528 entitled "Distance Measuring System," to Marshall, which is incorporated by reference in its entirety herein, describes inclusion of a scanning mirror located between the optical relay 150 and collimating lens 160 whereby target 180 may be scanned by outgoing reference beam 310 without affecting the position of the returned incoming beam 320 with respect to the photodetector 120. U.S. Pat. No. 7,348,528 also points out that with appropriate design and placement of the collimating lens 160 and the mirrored surface 172 of the knife-edge element 170, the use of the focal relay 150 further acts to prevent artifacts in the focus error signal that might be introduced by a longer optical path.

Figure 2:
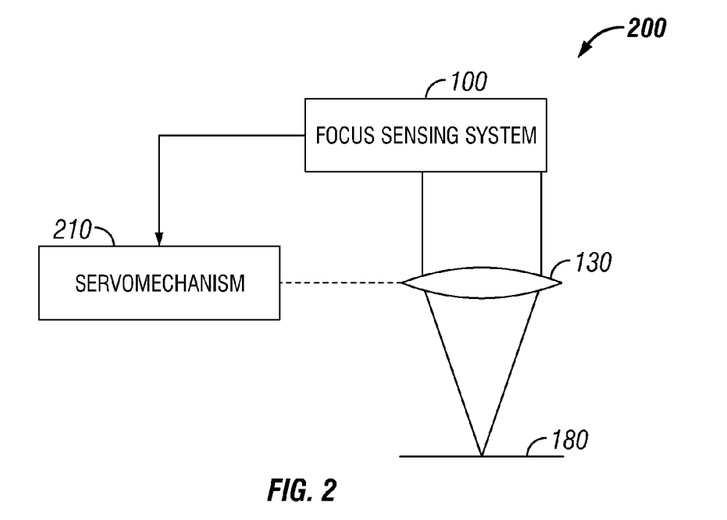
FIG. 2 is a simplified block diagram illustrating a focus sensing system as described herein when used as a component of an autofocus system.

Referring now to FIG. 2, a simplified block diagram illustrating a minimal autofocus sensing system 200 is illustrated. The focus sensing system 100 will typically be used as a component of a more complete autofocus system 200. The focus sensing system 100 may provide focus error data directly to a servomechanism 210, for example, to control the position of objective lens 130 with respect to the target 180. Alternately, the servomechanism 210 may be configured to reposition the target 180 with respect to the objective lens 130.

Figure 3:
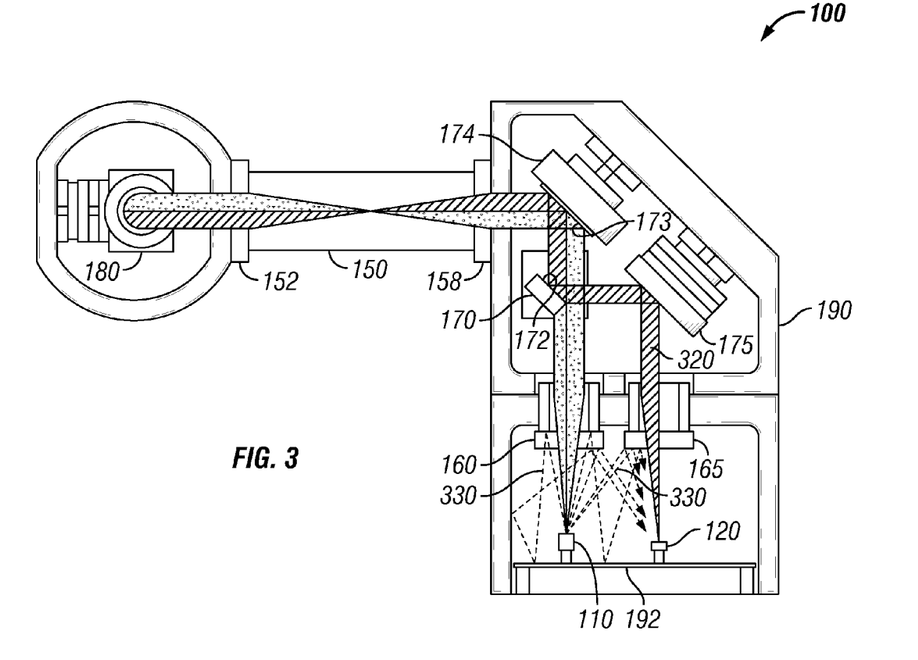
FIG. 3 is a plan view of the physical layout of the components of focus sensing system of FIG. 1 illustrating stray light paths from the light source.

Referring now to FIG. 3, a plan view of the physical layout of the components of focus sensing system of FIG. 1 is shown illustrating stray light paths from the light source. To better accommodate practical applications, the optical system comprising focus sensing system 100 has been reconfigured and mounted to housing 190. The light source 110 and the photo detector 120 are mounted on a common electronic circuit card or substrate 192 within housing 190.

The collimating lens 160 is positioned between the light source 110 and the knife-edge element 170. A folding mirror 173 has been added between the optical relay 150 and the knife-edge element 170. The primary effect of the physical configuration of the rearrangement of the optical system components is to reduce the spread of the overall focus sensing system 100. This configuration allows the knife-edge element 170 to be relocated to a region of collimated light. Mirror 172 directs the incoming reference beam 320 onto a second mirror 175 and through a focusing lens 165 to focus the incoming reference beam 320 onto the photodetector 120.

By driving mirror 173 with a scanner mechanism 174, the focus sensing system 100 may be made to scan a surface of the target while still rejecting undesirable light reflections. Introduction of the scanner 174 divides the optical system into two optical spaces, a scanned space and a non-scanned space. The scanned space includes the optical path between the mirror 173 and the target 180, whereas the non-scanned space extends from the mirror 173 to the photo detector 120. Because the photodetector 120 is located in a non-scanned space it has improved properties for focus sensing.

The afocal relay 150 illustrates only one type of afocal relay, where lenses 152 and 158 have nominally equal focal lengths and unity magnification. However, relays of other magnifications may also be used. In another embodiment, a toric, or more specifically, a cylindrical lens may be used. As those having skill in the art will appreciate, any suitable relay may be used for this application.

Light rays 330 constitute undesirable stray light emitted by the light source 110 and reflected from the front and/or back faces of the collimating lens 160 and the focus lens 165 as well as from the interior walls of housing 190. Collectively the undesirable light rays form a lighted spot on the focus sensing detector that is not generally centered on the photo sensor elements. Therefore a significant portion of the undesirable stray light and reflections 330 are detected by the photodetector 120 biasing the focus error signal produced by the photodetector 120. The biasing offset is proportional to the light emitted by the light source 110 provided there are no significant changes in the reflecting properties of the stray light generating elements. It should be noted that the bias term affects both the difference (focus error) signal and the sum (total light in the incoming beam) signal. Correcting these biases with an offset term proportional to the outgoing light level therefore is able to correct errors in both the focus signal and the reflected light signal used to control servo gain. It should be noted that diode laser emitters often contain a so-called monitor photodiode within the laser enclosure, positioned so that the monitor photodiode samples light from the rear facet of the laser. This monitor photodiode may also be used to measure the light emitted from the laser diode source, but in practice its position may be problematical because of light reflected from the surface under observation, confounding the forward-emitted light with the reflectance of the test surface. Therefore it is preferable in many cases to use light emitted in the forward direction by the laser diode light source to provide a correction term.

Figure 4:
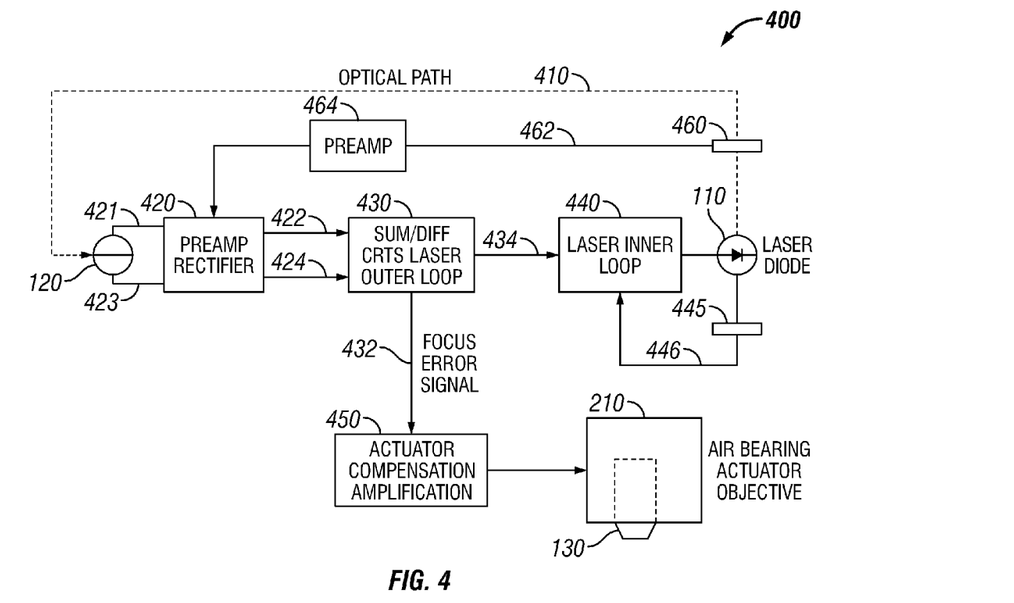
FIG. 4 is a block diagram illustrating an embodiment of an autofocus system according to the present disclosure.

Referring now to FIG. 4, a block diagram illustrating an embodiment of an autofocus system according to the present disclosure is shown. The autofocus system 400 provides a focus error signal on line 432, derived from the incoming reference beam 320, to a focusing actuator 210 which adjusts the position of the objective lens 130 with respect to a target under investigation. Effectively, the entire system is a servomechanism that maintains correct focus if the target surface tends to move toward or away from the objective lens 130. Light source 110 generates an outgoing modulated reference beam 310 which passes to the target surface and is reflected back to the photodetector 120 along the optical path 410, as described above with reference to FIGS. 1 and 3. Modulation of light source 110 on and off at a suitable frequency such as 45 kHz allows the receiving circuit to reject other sources of light such as a DC microscope illuminator or 60 Hz fluorescent ambient lighting, for example. In some embodiments, the light source 110 may comprise a laser, such as a laser diode, for example; however, any suitable light source may be used. In some embodiments, photodetector 120 may comprise a pair of photodiodes, each of the photodiodes being sensitive to a portion of the receiving surface of the photodetector 120. Each photodiode generates an electrical current proportional to the amount of light falling on the respective portion of the receiving surface it is sensitive to. However, as will be appreciated by those having skill in the art, any photodetector suitable for the purpose may be used. In another embodiment, photodetector 120 may comprise a position sensitive detector, such a two dimensional lateral-effect photodiode position sensitive detector (PSD) in which the amount of current is divided between two outputs according to the position of the centroid of a spot of light on the PSD surface. Photodetector 120 thus provides an alternating modulated signal on line 421 and on line 423 to pre-amplifier 420 where the signals are rectified and amplified to provide two signals, a channel A and a channel B signal, for example, on lines 422 and 424, respectively, to a sum/difference circuit 430. Sum/difference circuit 430 calculates a focus error signal on line 432 which in some embodiments may comprise the difference between the channel A and channel B signals. The focus error signal is then coupled to focusing actuator 210 via servo driver circuit 450. Sum/difference circuit 430 also calculates a light source control signal on line 434 which in some embodiments may comprise the sum of the channel A and channel B signals on lines 422 and 424, respectively.

As discussed above, stray light originating from the light source 110 is proportional to the light output by the light source 110. A significant portion of the undesirable stray light and reflections 330, as shown in FIG. 3, are detected by the photodetector 120 biasing the signals produced by the photodetector 120 on lines 421 and 423. The biasing offset is proportional to the light emitted by the light source 110. An auxiliary photodetector 460 is positioned in close proximity to the light source 110 and detects a portion of the outgoing light generated by light source 110. The output signal from auxiliary detector 460 constitutes a bias offset signal and is coupled on line 462 to preamp 464 where the signal is rectified and amplified. The bias offset signal is the coupled to preamp/rectifier circuit 420 to correct the signals output by photodetector 120 on lines 421 and 423 to provide channel A and channel B signals on lines 422 and 424 corrected for the biasing effects of the stray light produced by the light source 110. Detector 445 constitutes monitor photodiode positioned so that it samples the light produced by light source 110 and is utilized in a high bandwidth circuit which regulates the gain of the servomechanism, controlling the output of the light source 110 using the sum of the corrected channel A and channel B signals on lines 422 and 424, respectively. Monitor photodetector 445 generates an electrical current signal on line 446 proportional to the amount of light energy it detects. The current signal on line 446 is indicative of the light source 110 power level. In the case of a laser diode being used as light source 110, photodetector 445 is typically incorporated into the laser diode housing as a monitor for the light emitted from the rear facet of the laser. The light source control signal on line 434 is coupled to a light source driver circuit 440. The light source power level signal is also coupled on line 446 to light source driver circuit 440. The power level signal on line 446 is used with the light source control signal on line 434 to generate a power level adjustment for the light source 110 in response to changes in reflectance of the target.

Figure 5:
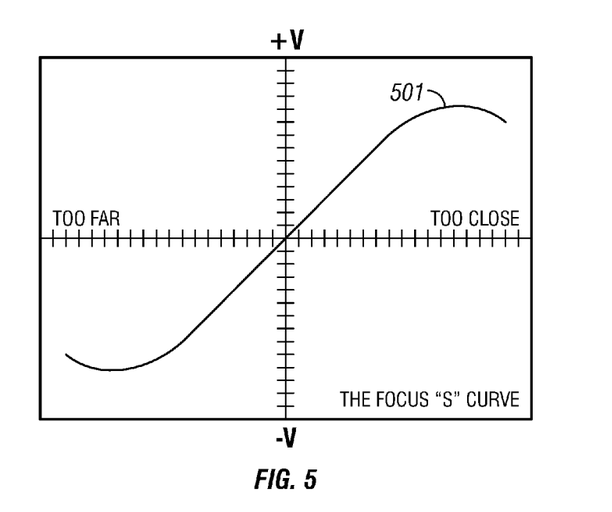
FIG. 5 is a graph illustrating an idealized focus error signal.
Figure 6:
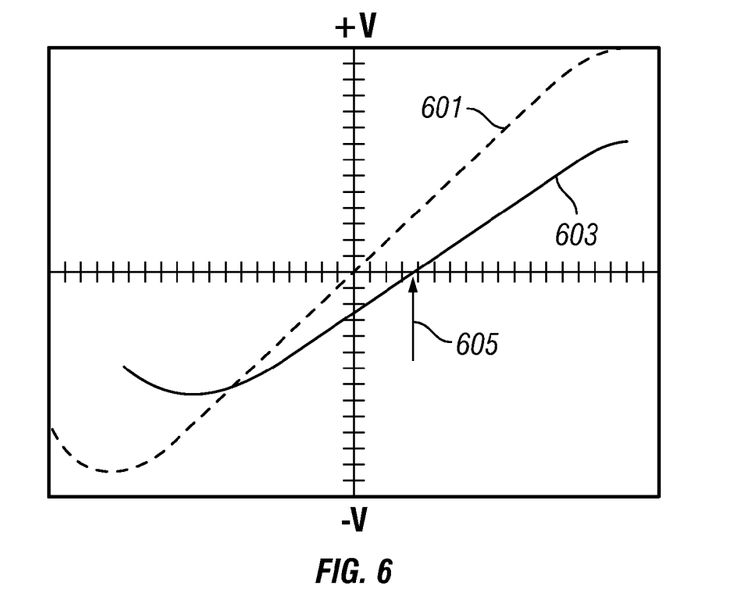
FIG. 6 is a graph illustrating a focus error signal in the presence of stray light.
Figure 7:
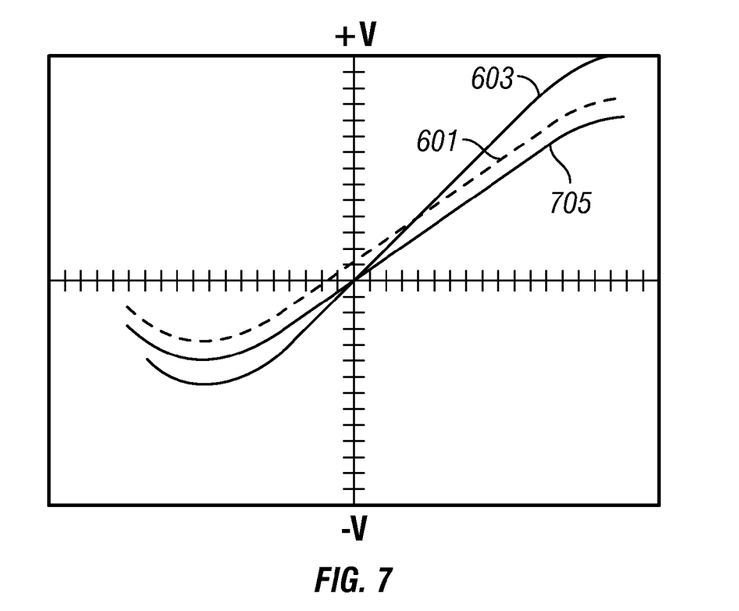
FIG. 7 is a graph illustrating a focus error correction signal and its effect on the focus error signal.

Referring now to FIGS. 5, 6 and 7, various graphs for the focus function and the biasing effects due to stray light and undesirable reflects and for compensation of the focus function are illustrated. When a device is initially constructed a correction for stray light is often included by using a highly reflective target, so that the optical system is clearly focused. FIG. 5 illustrates an idealized focus function curve 501 for such a newly constructed and compensated system having compensation for stray light. However, in practice the optical system must respond to targets of varied reflectance, and if the reflectance of the target changes the laser power circuit will change the light output as required to maintain servomechanism gain. The result is shown in FIG. 6. The servomechanism circuit will maintain a position where the output voltage is zero as in FIG. 5; however this position incorporates an axial position offset 605 equal to the distance between where curve 601 crosses the horizontal axis and where curve 601 crosses the axis. The result is defocus by the servomechanism. In other words, a target having reduced reflectance, for example, changes the ratio of the stray light in the system to light reflected from the target, and, typically, the initial stray light correction produces an incorrect focus error signal for the system. The effect of changed or reduced target reflectance reduction without the power control circuit would be to shift the focus function vertically and to decrease the slope of the curve 603. With the power control circuit but without the offset control the result will simply be defocus. Overall, the result of stray light is an error in measured focus that varies with the amount of light reflected from the target. At one output level and/or target surface reflection there may be zero focus error, but at other output levels or target surface reflectance there may be a measurable error. Without stray light correction an autofocus servomechanism will only work correctly if the target surface reflectance is unchanging; with stray light correction an autofocus system will remain correctly focused if the target reflection changes.

FIG. 7 illustrates the effect of stray light compensation on the focus function. By adding only offset correction for stray light a more highly reflective surface would have a focus curve like that of 705. With only a power correction circuit the curve would look like curve 601. If both power correction and offset correction are applied the result will be like that of curve 603. It is important to note that the offset correction of the preferred embodiment affects both the difference and the sum signal, and thus produces a superior focus curve both in its effect on gain and on maintaining the correct focus.

Figure 8:
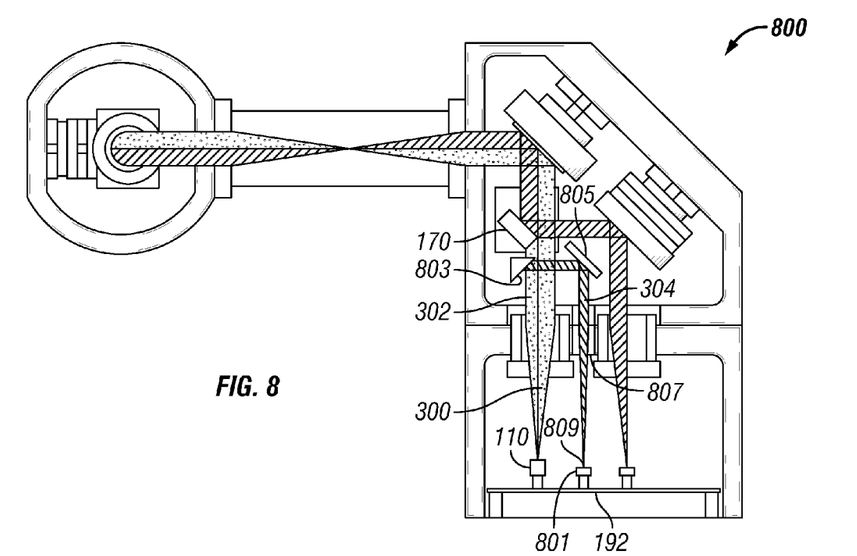
FIG. 8 is a plan view of the physical layout of the components of one embodiment of an autofocus system according to the present disclosure.

Referring now to FIG. 8, a plan view of the physical layout of the components of one embodiment of an autofocus system 800 according to the present disclosure is shown. The elements of autofocus system 800 are generally identical to the elements of the autofocus system 100 as shown in FIG. 3 described above, except that an auxiliary photodetector 801 is mounted on circuit board 192. Although it has been omitted for clarity it may be necessary to apply shrouds or baffles to prevent stray light from falling on auxiliary detector 801. Photodetector 801 samples the output of the light source 110 and provides a signal proportional to the output or power level of the outgoing light from source 110. A mirror 803 is positioned in the unused portion 302 of the outgoing light beam 300 generated by light source 110 intercepting the unused portion 302 prior to the outgoing beam 300 reaching the knife-edge element 170. A portion or all of the intercepted unused portion 302 of outgoing light beam 300 forms a light source reference beam 304 and is reflected by mirror 803 to a folding mirror 805. The mirror 805 then directs the light source reference beam 304 through a focusing lens 807 to the surface 809 of the auxiliary photodetector 801. Additional beam conditioning elements such as diffusers may also be used to condition the light falling on detector 801, especially in the case where the source of light may be a coherent source such as a laser.

Figure 9:
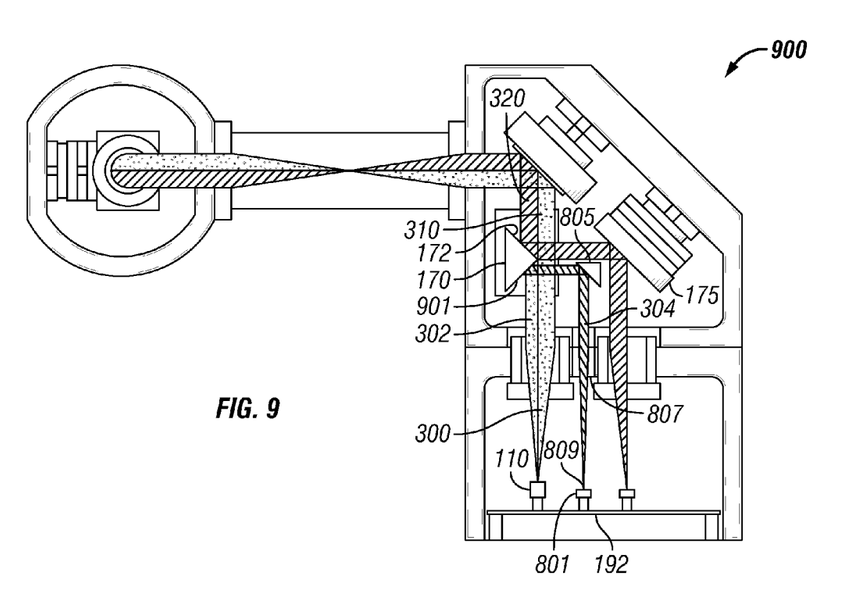
FIG. 9 is a plan view of the physical layout of the components of another embodiment of an autofocus system according to the present disclosure.

Referring now to FIG. 9, a plan view of the physical layout of the components of another embodiment of an autofocus system 900 according to the present disclosure is shown. The elements of autofocus system 900 are generally equivalent to the elements of the autofocus system 800 as shown in FIG. 8 described above. A knife-edge element 170 is positioned to intercept the outgoing light beam 300 generated by the light source 110 to form an outgoing reference beam 310. The backside of knife-edge element 170 forms a mirror 172 which directs the incoming reference beam 320 to mirror 175. The front side of knife-edge element 170 forms a folding mirror 901 which redirects a portion of or the entire unused portion 302 of the outgoing light beam 300 to a folding mirror 805. The redirected unused portion 302 of outgoing light beam 300 forms a light source reference beam 304. The mirror 805 then directs the light source reference beam 304 through a focusing lens 807 to the surface 809 of the auxiliary photodetector 801.

Figure 10:
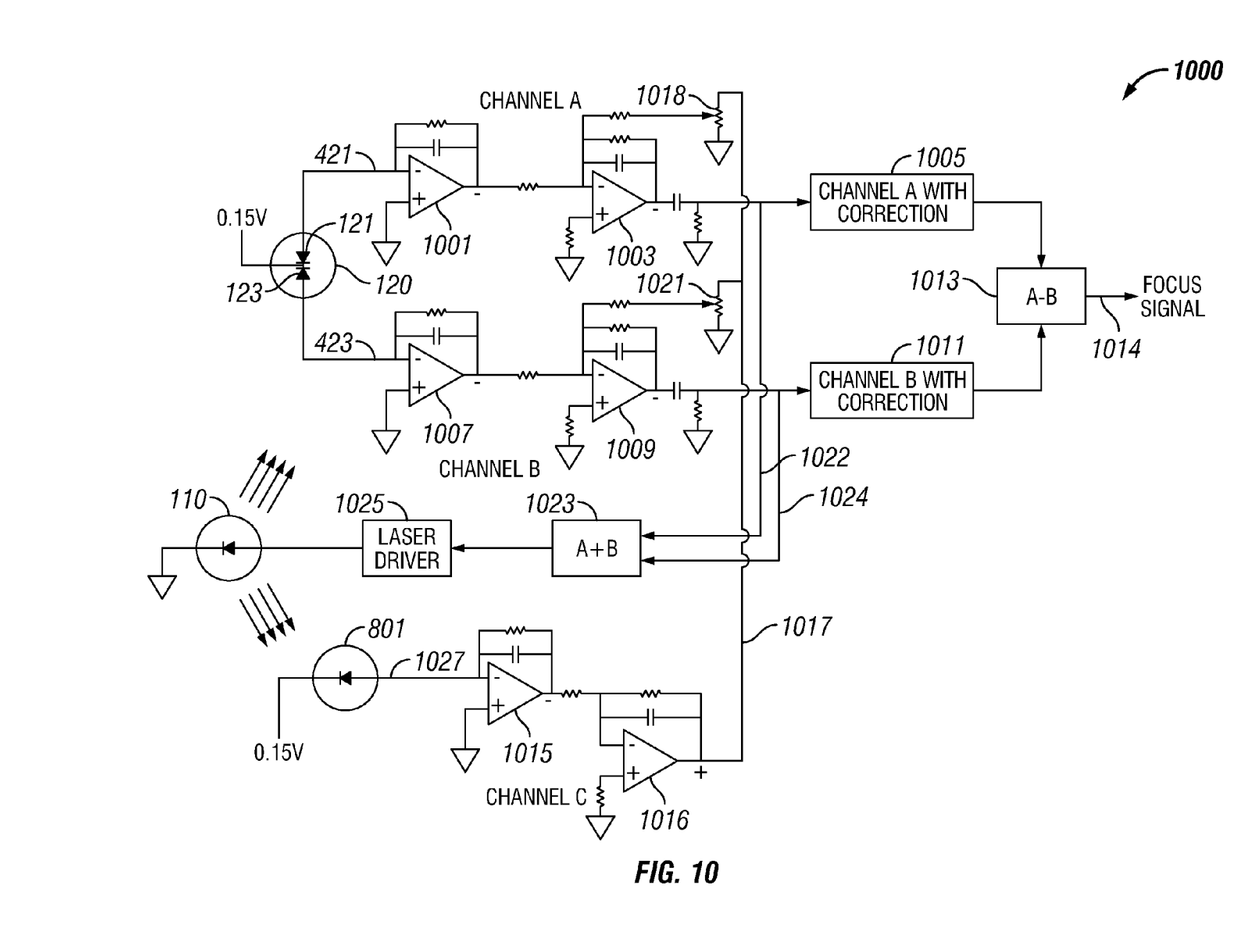
FIG. 10 is a schematic diagram of one embodiment of an autofocus system according to the present disclosure.

Referring now to FIG. 10, a schematic diagram of one embodiment of an autofocus system 1000 with stray light compensation according to the present disclosure is shown. The effect of stray light in an optical system on the focus error signal is proportional to, or is at least determined by, the amount of light being generated by the light source. Any stray light in the optical system originating from other sources must either be eliminated or its effects removed by other means. Photodetector 120 detects the incoming reference beam (as described above) to generate a focus error signal. Photodetector 120 may comprise a pair of photodiodes, each of the photodiodes being sensitive to a portion of the receiving surface of the photodetector 120. Each of the photodiodes, 121, 123, generates an electrical current signal proportional to the amount of light incident on the portion of the photodetector 120 surface that each photodiode 121, 123 is sensitive to. Photodiode 121 provides a signal on line 421 to the channel A operational amplifiers ("op amp") 1001, 1003 which detect and amplify the channel A signal and provide the signal to the channel A input circuit 1005. Similarly, photodiode 123 provides a signal on line 423 to channel B op amps 1007, 1009 which detect and amplify the channel B signal and provide the signal to the channel B input circuit 1011. An auxiliary photodetector 801 detects light generated by the light source 110 and provides a signal that is proportional to the light source 110 output level. Auxiliary photodetector 801 may comprise a photodiode that generates a signal proportional to the amount of light incident on the sensing surface of auxiliary photodetector 801. Auxiliary photodetector 801 provides a signal on line 1027 to channel C op amps 1015, 1016 which detect and amplify the channel C signal to provide a correction signal at the output terminal of op amp 1016 to compensate for stray light generated by the light source 110. The correction signal is coupled on line 1017 to channel A and channel B via variable resistors 1018 and 1021, respectively. These variable resistors set a mathematical constant of proportionality and are typically set at the time of manufacture. A portion of the correction signal is coupled to channel A op amp 1003 and channel B op amp 1009 providing negative feedback compensating the channel A and channel B signals, respectively, for the effects of stray light generated by the light source 110. The corrected channel A and Channel B signals are then coupled to difference circuit 1013, a differential amplifier, for example. The difference circuit 1013 takes the difference between the channel A and channel B signals to generate the focus error signal at its output 1014. As described above, the focus error signal is coupled to a servo mechanism to adjust the focus of the system. It should be noted that for purposes of clarification this schematic does not show rectification circuits previously mentioned.

The corrected channel A and channel B signals are also coupled to an additive circuit 1023 via lines 1022 and 1024, respectively. Additive circuit 1023 sums the channel A and Channel B signals and provides the summed signal to a driver circuit 1025 which controls the power level of the light source 110. The light source 110 also has an internal monitor (not shown) that provides a signal to the driver 1025 for power stabilization of the light source 110.

Figure 11:
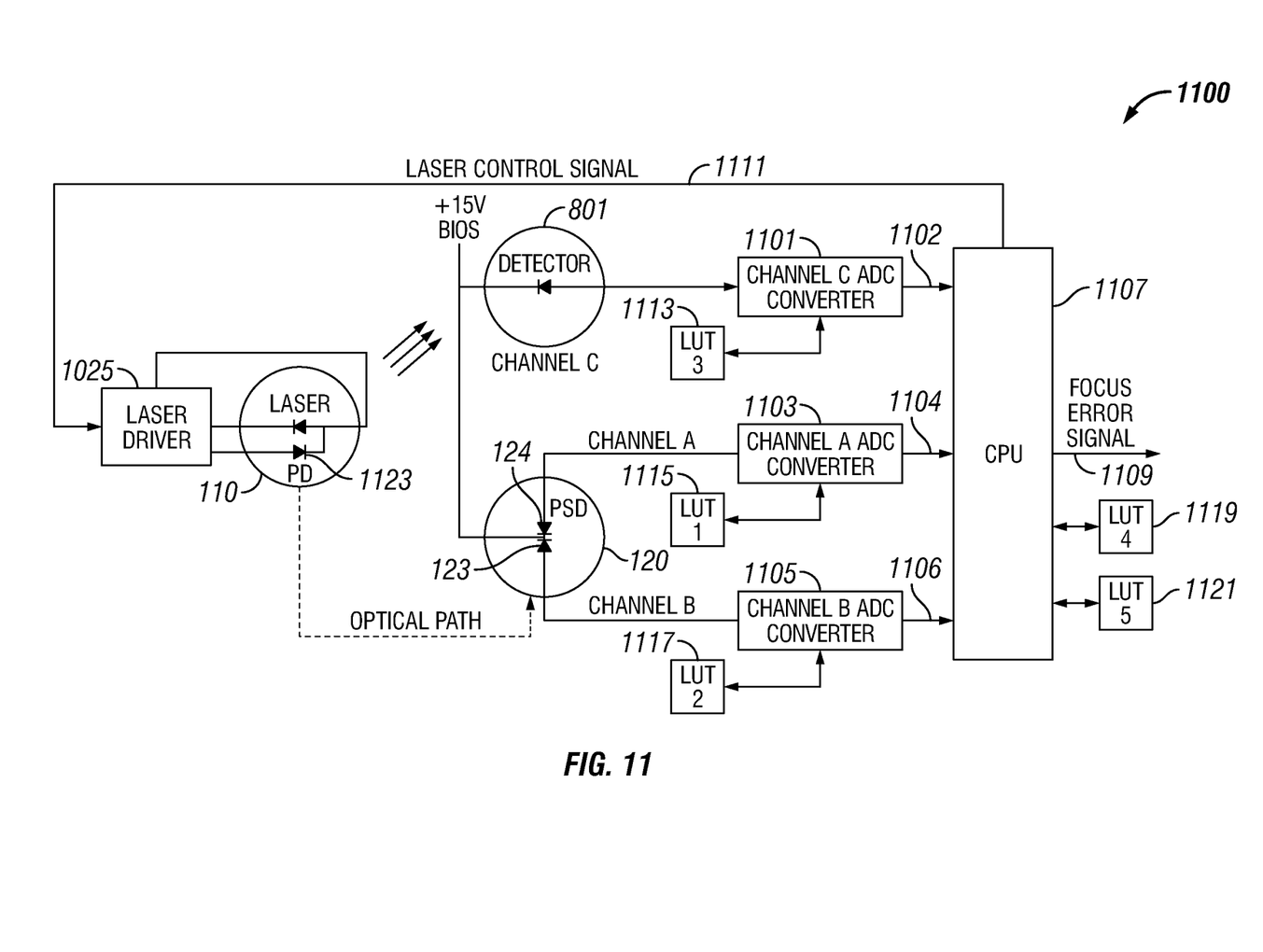
FIG. 11 is a schematic diagram of another embodiment of an autofocus system according to the present disclosure.

Referring now to FIG. 11, a schematic diagram of another embodiment of an autofocus system with stray light compensation according to the present disclosure is shown. The foregoing discussion with respect to FIG. 10, describes analog circuits as one embodiment of the use of a portion of the outgoing light of the light source to correct for stray light. FIG. 11 provides another embodiment wherein digital circuits perform similar functions using, for example, analog to digital converters (ADC), and a microprocessor to correct for stray light. Photodetector 120 detects the incoming reference beam (as described above) to generate a focus error signal. Photodetector 120 may comprise a pair of photodiodes 124, 123, each of the photodiodes being sensitive to a portion of the receiving surface of the photodetector 120. Each of the photodiodes, 124, 123, generates an electrical current signal proportional to the amount of light incident on the portion of the photodetector 120 surface that each photodiode 124, 123 is sensitive to. Photodiode 124 provides an analog signal to a channel A ADC 1103, which detects the channel A signal and converts the analog signal to a digital level. The digital channel A signal is then coupled to CPU 1107 on line 1104. Similarly, photodiode 123 provides an analog signal to a channel B ADC 1105 which detects and converts the analog signal to a digital level. The digital channel B signal is then coupled to CPU 1107 on line 1106. An auxiliary photodetector 801 detects light generated by the light source 110 and provides an analog current signal that is proportional to the light source 110 output level. Auxiliary photodetector 801 may comprise a photodiode that generates a signal proportional to the amount of light incident on the sensing surface of auxiliary photodetector 801. Auxiliary photodetector 801 provides an analog signal to a channel C ADC 1101 which detects and converts the analog signal to a digital level. The digital channel C signal provides a correction signal at the output of ADC 1101 to compensate for stray light generated by the light source 110. The correction signal is coupled on line 1102 to CPU 1107. CPU 1107 corrects the channel A and channel B signal using the correction signal. A portion of the correction signal determined by a mathematical constant of proportionality, typically set at the time of manufacture, compensates the channel A and channel B signals, respectively, for the effects of stray light generated by the light source 110. CPU 1107 provides the difference between the corrected channel A and channel B signals to generate a focus error signal at its output 1109. As described above, the focus error signal is coupled to a servo mechanism to adjust the focus of the system. CPU 1107 also provides the sum of the corrected channel A and channel B signals to a driver circuit 1025 which controls the power level of the light source 110. The light source 110 includes an internal power detector 1123 that provides a signal to the driver 1025 for power stabilization of the light source 110. As described with reference to FIG. 4, power detector 1123 may be a photodetector incorporated into the light source housing as a monitor for the light emitted from the light source 110. In the case where the light source 110 is a laser diode, the monitor photodetector detects the laser light emitted from the rear facet of the laser and generates an electrical current signal proportional to the amount of light energy it detects. This current signal is indicative of the light source 110 power level. Alternatively, the power detector 1123 may be a monitoring circuit, such as a current mirror, that provides as its output, the light source 110 current. The light source current is proportional to the light source power level. The output of the power detector 1123 is coupled to driver circuit 1025.

The above discussion assumes the use of a portion of the outgoing light from a light source to correct for stray light produced by the light source is a strict, i.e., linear, proportionality. In the case where the strict proportionality does not hold, look-up tables ("LUT") may be used to compensate for any non-linearity in the light source output characteristics. Such LUTs may be constructed by taking and storing digital values corresponding to detected signals over a wide range of source power and of reflectance values at the target surface. For example, signal return values may be detected for bright, medium and dark target surface areas to generate a LUT to compensate for reflectance changes. As shown in FIG. 3, photodiode 124 provides an analog signal to a channel A ADC 1103, which detects the channel A signal and converts the analog signal to a digital level. This digital level is then used to reference LUT 1, 1115, to scale the channel A digital signal on line 1104. Similarly, LUT 2, 1117, is referenced with the ADC 1105 digital signal to scale the channel B digital signal on line 1106. In a similar manner, the correction signal on line 1102 is scaled by reference to LUT 3, 1113. CPU 1107 then corrects the channel A signal using the correction signal and LUT 4, 1119, and the channel B signal using the correction signal and LUT 5, 1121. CPU 1107 determines the difference between the corrected channel A and channel B signals to provide a focus error signal on line 1109. CPU 1107 determines the sum of the corrected channel A and channel B signals to provide a light source control signal on line 1111 to driver circuit 1025 which controls the power level of the light source 110.

Although the foregoing discussion describes both analog and digital circuitry, in each case the principle is unchanged: a portion of the outgoing light emitted by the light source is used to compensate for offsets in a focus error signal. In this way any offset in the focus signal which is either proportional or uniquely determined by the outgoing light level may be removed.

Figure 12:
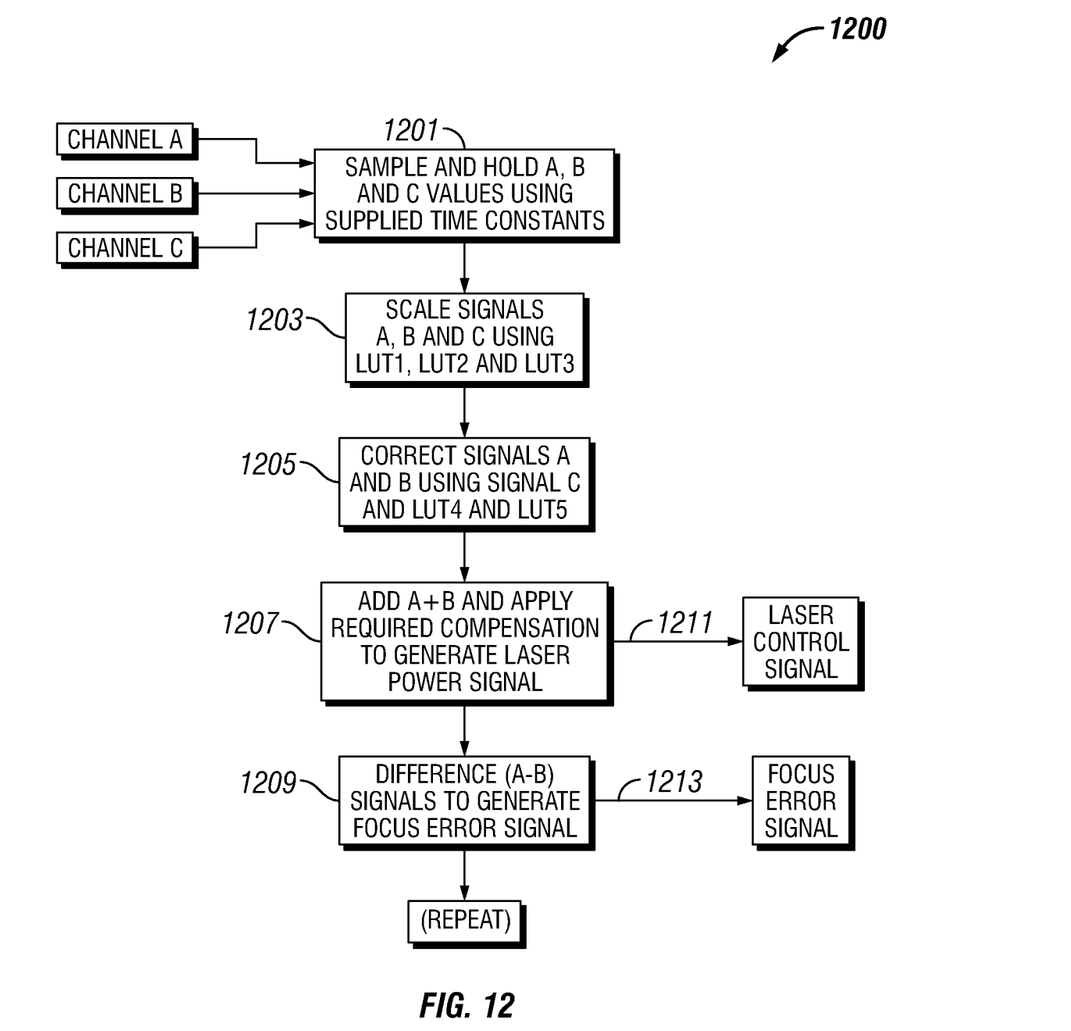
FIG. 12 is a flow chart illustrating a simplified algorithm for digital stray light compensation according to the present disclosure.

Referring now to FIG. 12, a flow chart illustrating a simplified algorithm for digital stray light compensation according to the present disclosure is shown. At block 1201, the channel A, B and C signals provided by detectors 124, 123 and 801, respectively, are converted to digital levels using sample and hold circuits, such as an ADC, for example, having predetermined time constants. At block 1203, the digital levels representing the channel A, B and C signals are scaled by accessing LUT 1, LUT 2 and LUT 3. At block 1205, the channel A and B signals are corrected using the channel C signal and LUT 4 and LUT 5, respectively. At block 1207, the sum of corrected channel A and channel B signals is determined to provide a light source control signal, such as a laser power control signal, for example, on line 1211. At block 1209, the difference between corrected channel A and channel B signals is determined to provide a focus error signal on line 1213. The process is repeated at the light source modulation rate.

It should also be noted that this technique not only corrects potential offsets in the focus error signal, which is derived from the difference of two detector signals, but it also corrects for offsets in the sum signal which is used to control the power level of the light source. The focus error signal is thereby corrected for both offset errors and for gain errors as caused by stray light.

While the methods and apparatus of the present application have been described in terms of various embodiments, it will be apparent to those of skill in the art that variations may be applied to the methods, apparatus and/or processes, and in the steps or in the sequence of steps of the methods described herein without departing from the concept and scope of the application. More specifically, it will be apparent that certain features which are both mechanically and functionally related may be substituted for the features described herein while the same or similar results would be achieved. All such similar substitutes and modifications apparent to those skilled in the art are deemed to be within the scope and concept of the application.

What is claimed is:

1. An autofocus system for use in an optical system that is capable of examining a target surface and that includes an objective lens defining a system in-focus region, comprising:
   a light source emitting an outgoing reference beam of light, wherein a portion of the outgoing reference beam is reflected from the target surface as an incoming reference beam;
   a first photodetector disposed in the path of the incoming reference beam and adapted to generate a first electrical signal according to the position of the incoming reference beam on a sensing surface of the photodetector;
   a second photodetector disposed to receive a portion of the light emitted by the light source and adapted to generate a second electrical signal proportional to the light incident on a sensing surface of the second photodetector;
   wherein the first photodetector comprises a pair of photodiodes;
   wherein the first electrical signal comprises channel A and channel B signals, the channel A signal being proportional to the portion of the incoming reference beam incident on the first photodiode, the channel B signal being proportional to the portion of the incoming reference beam incident on the second photodiode; and
   wherein the second electrical signal provides a correction signal to the channel A signal and the channel B signal, and a focus error signal comprises the difference between the corrected channel A signal and the corrected channel B signal.

2. The autofocus system of claim 1, further comprising:
   a collimating lens in the path of the outgoing reference beam; and a reflecting knife-edge element defining a plane, the knife-edge element disposed to obstruct a portion of the outgoing reference beam on a first side of the plane and to reflect the incoming reference beam on a second side of the plane.

3. The autofocus system of claim 2, further comprising:
a first mirror disposed in the obstructed portion of the outgoing reference beam to reflect a portion or all of the obstructed portion of the outgoing reference beam, the reflected portion or all of the obstructed portion of the outgoing reference beam forming a light source reference beam; and
a second mirror disposed to reflect the light source reference beam onto the sensing surface of the second photodetector.

4. The autofocus system of claim 3, further comprising a focusing lens disposed in the path of the light source reference beam between the second mirror and the sensing surface of the second photodetector.

5. The autofocus system of claim 1, further comprising a reflecting knife-edge element defining a plane, the knife-edge element disposed to reflect a portion of the outgoing reference beam on a first side of the plane and to reflect the incoming reference beam on a second side of the plane.

6. The autofocus system of claim 5, further comprising:
a collimating lens in the path of the outgoing reference beam; and
a mirror disposed to reflect the reflected portion of the outgoing reference beam onto the sensing surface of the second photodetector.

7. The autofocus system of claim 2, further comprising a focusing lens in the path of the incoming reference beam.

8. The autofocus system of claim 1, wherein the light source comprises a laser.

9. The autofocus system of claim 8, further comprising a photodiode disposed adjacent a rear facet of the laser for monitoring the output of the laser and providing an electrical signal indicative of the laser power.

10. The autofocus system of claim 8, further comprising a current mirror for monitoring the laser current and providing an electrical current indicative of the laser current.

11. The autofocus system of claim 1, wherein a light source gain signal comprises the sum of the corrected channel A signal and the corrected channel B signal.

12. The autofocus system of claim 1, wherein the second photodetector comprises a photo-diode.

13. The autofocus system of claim 1, wherein the first photodetector comprises a position sensitive detector.

14. A method of compensating for stray light emitted by a light source for use in an optical system that is capable of examining a target surface and that has an objective lens defining a system in-focus region, comprising the steps of:
providing an outgoing reference beam of light, wherein a first portion of the outgoing reference beam is reflected from the target surface as an incoming beam;
generating a first electrical signal proportional to the position of the incoming reference beam on a sensing surface of a first photodetector;
generating a second electrical signal proportional to light emitted by the light source incident on a sensing surface of a second photodetector;
wherein the first photodetector comprises a pair of photodiodes;
wherein the first electrical signal comprises channel A and channel B signals, the channel A signal being proportional to the portion of the incoming reference beam incident on a first photodiode of the pair of photodiodes, the channel B signal being proportional to the portion of the incoming reference beam incident on a second photodiode of the pair of photodiodes;
accessing a first look-up table to provide a first digital value representative of a value for the channel A signal compensated for non-linear characteristics of the light source;
accessing a second look-up table to provide a second digital value representative of a value for the channel B signal compensated for non-linear characteristics of the light source; and
accessing a third look-up table to provide a third digital value representative of a value for the second electrical signal compensated for non-linear characteristics of the light source.

15. The method of claim 14, further comprising the step of compensating the first electrical signal with the second electrical signal for stray light emitted by the light source in the optical system.

16. The method of claim 15, wherein the step of compensating the first electrical signal includes the step of controlling a power level of the light source with the second electrical signal.

17. The method of claim 14, wherein the light source comprises a laser.

18. The method of claim 14, further comprising the steps of:
accessing a fourth look-up table with the first and third digital valves to provide a corrected digital valve representative of the channel A signal corrected for stray light emitted by the light source; and
accessing a fifth look-up table with the second and third digital valves to provide a corrected digital valve representative of the channel B signal corrected for stray light emitted by the light source.

19. The method of claim 14, wherein the second electrical signal provides a correction signal to the channel A signal and the channel B signal, and a focus error signal comprises the difference between the corrected channel A signal and the corrected channel B signal.

20. The method of claim 19, wherein a light source gain signal comprises the sum of the corrected channel A signal and the corrected channel B signal.

21. The method of claim 19, wherein the focus error signal is coupled to a servomechanism, the servomechanism adjusting the position of an objective lens.

22. The method of claim 14, wherein the second photodetector comprises a photodiode.

23. The method of claim 14, wherein the first photodetector comprises a position sensitive detector.

24. The method of claim 14, further comprising the step of reflecting a second portion of the outgoing reference beam onto the sensing surface of the second photodetector.

25. An autofocus system for use in an optical system that is capable of examining a target surface and that includes an objective lens defining a system in-focus region, comprising:
a light source emitting an outgoing reference beam of light, wherein a portion of the outgoing reference beam is reflected from the target surface as an incoming reference beam;
a first photodetector disposed in the path of the incoming reference beam and adapted to generate a first electrical signal according to the position of the incoming reference beam on a sensing surface of the photodetector;
a second photodetector disposed to receive a portion of the light emitted by the light source and adapted to generate a second electrical signal proportional to the light incident on a sensing surface of the second photodetector;

a collimating lens in the path of the outgoing reference beam;

a reflecting knife-edge element defining a plane, the knife-edge element disposed to obstruct a portion of the outgoing reference beam on a first side of the plane and to reflect the incoming reference beam on a second side of the plane;

a first mirror disposed in the obstructed portion of the outgoing reference beam to reflect a portion or all of the obstructed portion of the outgoing reference beam, the reflected portion or all of the obstructed portion of the outgoing reference beam forming a light source reference beam; and a second mirror disposed to reflect the light source reference beam onto the sensing surface of the second photodetector.

* * * * *